(12) United States Patent
Ogawa

(10) Patent No.: US 10,913,442 B2
(45) Date of Patent: Feb. 9, 2021

(54) HYBRID VEHICLE

(71) Applicant: TOYOTA JIDOSHA KABUSHIKI KAISHA, Toyota (JP)

(72) Inventor: Yuki Ogawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 367 days.

(21) Appl. No.: 15/795,944

(22) Filed: Oct. 27, 2017

(65) Prior Publication Data

US 2018/0134274 A1 May 17, 2018

(30) Foreign Application Priority Data

Nov. 14, 2016 (JP) ................................. 2016-221498

(51) Int. Cl.
*B60W 10/06* (2006.01)
*B60W 10/08* (2006.01)
(Continued)

(52) U.S. Cl.
CPC ............ *B60W 20/12* (2016.01); *B60W 10/06* (2013.01); *B60W 10/08* (2013.01); *B60W 20/40* (2013.01); *B60W 2510/244* (2013.01); *B60W 2552/15* (2020.02); *B60W 2554/00* (2020.02); *Y02T 10/62* (2013.01); *Y02T 10/70* (2013.01); *Y02T 10/7072* (2013.01); *Y10S 903/93* (2013.01)

(58) Field of Classification Search
CPC ...... B60W 20/12; B60W 10/08; B60W 10/06; B60W 20/40; B60W 2510/244; B60W 2550/142; B60W 2550/20; B60W 20/00; B60W 10/26; Y10S 903/93; Y02T 10/6239; Y02T 10/6286; Y02T 10/7005; Y02T 10/7077
See application file for complete search history.

(56) References Cited

U.S. PATENT DOCUMENTS 9,067,589 B1 * 6/2015 Zhao .................... B60W 10/06
2011/0071712 A1 * 3/2011 Mizuno .................... B60K 6/46
701/22
(Continued)

FOREIGN PATENT DOCUMENTS

JP 2000-134719 A 5/2000
JP 2012-147554 A 8/2012
(Continued)

*Primary Examiner* — Kelly D Williams
(74) *Attorney, Agent, or Firm* — Sughrue Mion, PLLC

(57) ABSTRACT

A hybrid vehicle includes: an engine, a first motor generator configured to generate electric power using power of the engine; a second MG connected to driving wheels; a power storage device electrically connected to the first MG and the second MG; and an electronic control unit. The electronic control unit is configured to execute pre-change control of changing an amount of power stored in the power storage device in advance before the hybrid vehicle enters a control target section on a scheduled traveling route and EV priority control of suppressing activation of the engine more when the hybrid vehicle travels in a specific area than when the hybrid vehicle travels in an area other than the specific area. The electronic control unit is configured to prohibit execution of the EV priority control during execution of the pre-change control.

4 Claims, 11 Drawing Sheets

(51) Int. Cl.
*B60W 20/12* (2016.01)
*B60W 20/40* (2016.01)

(56) References Cited

U.S. PATENT DOCUMENTS

| | | | | |
|---|---|---|---|---|
| 2011/0288712 A1* | 11/2011 | Wang | ............... | B60K 6/445 |
| | | | | 701/22 |
| 2013/0289815 A1 | 10/2013 | Suzuki | | |
| 2018/0056973 A1* | 3/2018 | Belt | ............ | B60W 50/0097 |

FOREIGN PATENT DOCUMENTS

| | | |
|---|---|---|
| JP | 2014-015125 A | 1/2014 |
| JP | 2014-213638 A | 11/2014 |
| JP | 2015-20651 A | 2/2015 |
| WO | 2015/011533 A1 | 1/2015 |

* cited by examiner

HYBRID VEHICLE

CROSS-REFERENCE TO RELATED APPLICATIONS

This application claims priority to Japanese Patent Application No. 2016-221498 filed on Nov. 14, 2016, which is incorporated herein by reference in its entirety.

BACKGROUND

Technical Field

The present disclosure relates to a hybrid vehicle that includes an internal combustion engine, a power generator (a first rotary electrical machine), an electric motor (a second rotary machine), and a power storage device.

Description of Related Art

A hybrid vehicle including an internal combustion engine, a power generator that can generate electric power using power of an internal combustion engine, an electric motor that is connected to driving wheels, and a power storage device that is electrically connected to the power generator and the electric motor is known. The power storage device is charged with at least one of regenerative power which is generated by the electric motor at the time of braking of the vehicle and electric power which is generated by the power generator using the power of the internal combustion engine.

A variety of types of control for supporting a user's energy-saving driving of a hybrid vehicle have been developed in the related art. An example thereof is "pre-change control" (which means "predicted SOC control"). Pre-change control is control of determining whether a control target section satisfying predetermined conditions is present on a scheduled traveling route of a hybrid vehicle using map information stored in a database of a navigation device or the like and changing a state of charge (hereinafter also referred to as a "SOC") of the power storage device depending on the control target section in advance before the vehicle enters the control target section when the control target section is present.

For example, Japanese Patent Application Publication No. 2014-15125 (JP 2014-15125 A) discloses a hybrid vehicle which is configured to execute "congestion SOC control" as an example of the above-mentioned pre-change control. The congestion SOC control is control of determining whether a target congested section satisfying predetermined conditions is present on a scheduled traveling route and increasing an SOC of a power storage device before the vehicle enters the target congested section in preparation for power consumption in the target congested section when the target congested section is present.

SUMMARY

A hybrid vehicle which is configured to execute "electric motor priority control" (which is also referred to as "EV priority control" or "EV home control") in addition to the "pre-change control" is also known. EV priority control is control of causing a hybrid vehicle to perform EV traveling in which the hybrid vehicle travels using power of an electric motor with an internal combustion engine stopped as much as possible in the vicinity of a user's home or in the vicinity of a destination.

However, in a hybrid vehicle which is configured to execute the pre-change control and the EV priority control, when the pre-change control and the EV priority control are simultaneously executed, there is a likelihood that the SOC of the power storage device will not change according to the purpose of the pre-change control and a support effect by the pre-change control will not be satisfactorily achieved.

For example, the congestion SOC control described in JP 2014-15125 A is control of increasing the SOC of the power storage device in advance before the vehicle enters a target congested section, but the EV priority control is control of performing EV traveling as much as possible with an internal combustion engine stopped. Accordingly, when the EV priority control is executed during execution of the congestion SOC control, power generation using the power of the internal combustion engine cannot be performed and the SOC of the power storage device cannot be increased according to the purpose of the congestion SOC control. Therefore, there is a likelihood that the SOC of the power storage device will not be satisfactorily increased before the vehicle enters the target congested section.

The present disclosure is made in consideration of the above-mentioned circumstances and provides a hybrid vehicle that prevents a state of charge (hereinafter also referred to as an SOC) of a power storage device from not being changed according to the purpose of pre-change control in the hybrid vehicle which is configured to execute pre-change control and electric motor priority control (hereinafter also referred to as "EV priority control").

Therefore, according to an aspect of the present disclosure, there is provided a hybrid vehicle including an internal combustion engine, a first rotary electrical machine, a second rotary electrical machine, a power storage device, and an electronic control unit. The first rotary electrical machine is configured to generate electric power using power of the internal combustion engine. The second rotary electrical machine is connected to driving wheels of the hybrid vehicle. The power storage device is electrically connected to the first rotary electrical machine and the second rotary electrical machine. The electronic control unit is configured to: (i) execute pre-change control which changes an amount of power stored in the power storage device in advance before the hybrid vehicle enters a control target section on a scheduled traveling route; (ii) execute EV priority control of suppressing activation of the internal combustion engine more when the hybrid vehicle travels in a specific area than when the hybrid vehicle travels in an area other than the specific area; and (iii) prohibit execution of the EV priority control during execution of the pre-change control.

According to this configuration of the hybrid vehicle, the EV priority control is not executed during execution of the pre-change control. Accordingly, it is possible to prevent the SOC of the power storage device from not being changed according to the purpose of the pre-change control.

In the hybrid vehicle, the electronic control unit may be configured: (i) not to execute the EV priority control but to continuously execute the pre-change control when execution conditions of the EV priority control are satisfied during execution of the pre-change control; and (ii) to stop execution of the EV priority control and to execute the pre-change control when execution conditions of the pre-change control are satisfied during execution of the EV priority control.

According to this configuration of the hybrid vehicle, it is possible to avoid execution of the EV priority control during execution of the pre-change control in any of a case in which the execution conditions of the EV priority control are satisfied during execution of the pre-change control and a case in which the execution conditions of the pre-change control are satisfied during execution of the EV priority control.

In the hybrid vehicle, the pre-change control may include congestion SOC control. The congestion SOC control may be control of increasing an amount of power stored in the power storage device in advance before the hybrid vehicle enters a congested section satisfying a first condition when the congested section is present as the control target section on the scheduled traveling route.

In the hybrid vehicle, the pre-change control may include downhill SOC control. The downhill SOC control may be control of decreasing an amount of power stored in the power storage device in advance before the hybrid vehicle enters a downhill section satisfying a second condition when the downhill section is present as the control target section on the scheduled traveling route.

According to the above-mentioned configuration of the hybrid vehicle, the EV priority control is not executed during execution of the congestion SOC. By executing the congestion SOC control with priority over the EV home control in this manner, it is possible to minimize interference between the congestion SOC control and the EV home control and to prevent forcible charging from being performed before the hybrid vehicle arrives at home. According to the above-mentioned configuration of the hybrid vehicle, the EV priority control is not executed during execution of the downhill SOC control. Accordingly, it is possible to prevent an amount of power stored in the power storage device from decreasing rapidly from a supposed level of the downhill SOC control.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
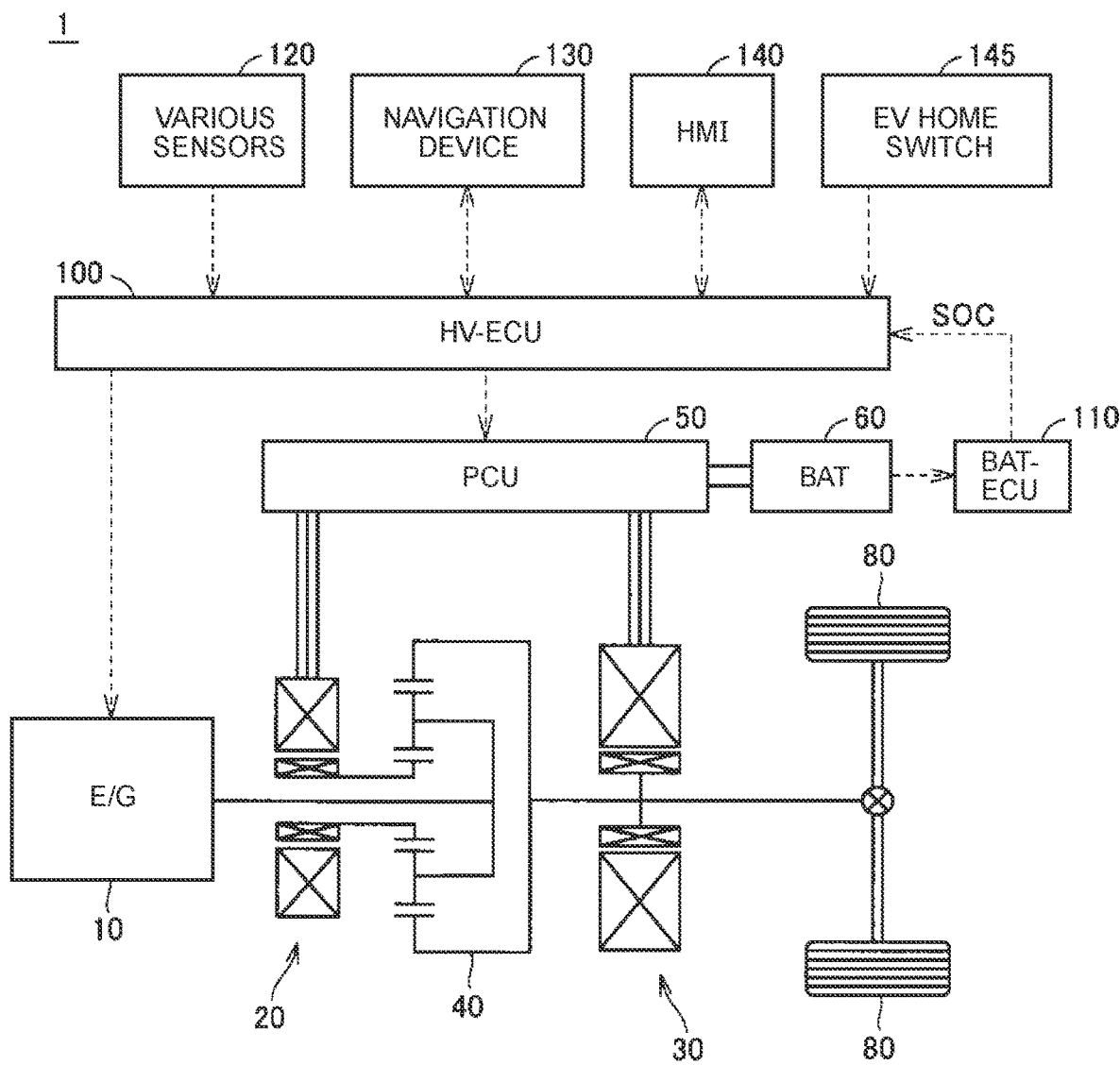
FIG. 1 is a diagram illustrating a whole configuration of a hybrid vehicle according to the present disclosure.

Hereinafter, an embodiment of the present disclosure will be described in detail with reference to the accompanying drawings. Identical or corresponding elements in the drawings will be referenced by the same reference signs and description thereof will not be repeated.

FIG. 1 is a diagram illustrating a whole configuration of a vehicle 1 according to an embodiment of the present disclosure. The vehicle 1 includes an engine 10, a first motor generator (hereinafter referred to as a "first MG") 20, a second motor generator (hereinafter referred to as a "second MG") 30, a power split device 40, a power control unit (PCU) 50, a power storage device 60, and driving wheels 80.

The vehicle 1 is a hybrid vehicle which travels using at least one of power of the engine 10 and power of the second MG 30.

The engine 10 is an internal combustion engine that outputs power by converting combustion energy, which is generated when an air-fuel mixture is combusted, into kinetic energy of a mobile member such as a piston or a rotor. The power split device 40 includes, for example, a planetary gear mechanism including three rotary shafts such as a sun gear, a carrier, and a ring gear. The power split device 40 splits power output from the engine 10 into power for driving the first MG 20 and power for driving the driving wheels 80.

The first MG 20 and the second MG 30 are AC rotary electrical machines and are, for example, three-phase AC synchronous electric motors in which a permanent magnet is embedded in a rotor. The first MG 20 is used mainly as a power generator that is driven by the engine 10 via the power split device 40. Electric power generated by the first MG 20 is supplied to the second MG 30 or the power storage device 60 via the PCU 50.

The second MG 30 serves mainly as an electric motor and drives the driving wheels 80. The second MG 30 is driven by at least one of electric power from the power storage device 60 and electric power generated by the first MG 20, and a driving force of the second MG 30 is transmitted to the driving wheels 80. On the other hand, at the time of braking the vehicle 1 or decelerating the vehicle 1 on a downhill road, the second MG 30 serves as a power generator to generate regenerative power. Electric power generated by the second MG 30 is recovered to the power storage device 60 via the PCU 50.

The PCU 50 converts DC power supplied from the power storage device 60 into AC power for driving the first MG 20 and the second MG 30. The PCU 50 converts AC power generated by the first MG 20 and the second MG 30 into DC power for charging the power storage device 60. For example, the PCU 50 includes two inverters that are disposed to correspond to the first MG 20 and the second MG 30 and a converter that steps up a DC voltage supplied to each inverter to a voltage of the power storage device 60 or higher.

The power storage device 60 is a DC power source that is rechargeable and includes, for example, a secondary battery such as a lithium-ion battery or a nickel-hydride battery. The power storage device 60 is charged with electric power generated by at least one of the first MG 20 and the second MG 30. The power storage device 60 supplies the stored electric power to the PCU 50. An electric double-layer capacitor or the like may be employed as the power storage device 60.

The power storage device 60 is provided with a voltage sensor, a current sensor, and a temperature sensor that detect a voltage, an input/output current, and a temperature of the power storage device 60, and values detected by the sensors are output to a BAT-ECU 110.

The vehicle 1 includes an HV-electronic control unit (ECU) 100, a BAT-ECU 110, various sensors 120, a navigation device 130, a human-machine interface (HMI) device 140, and an EV home switch 145.

Figure 2:
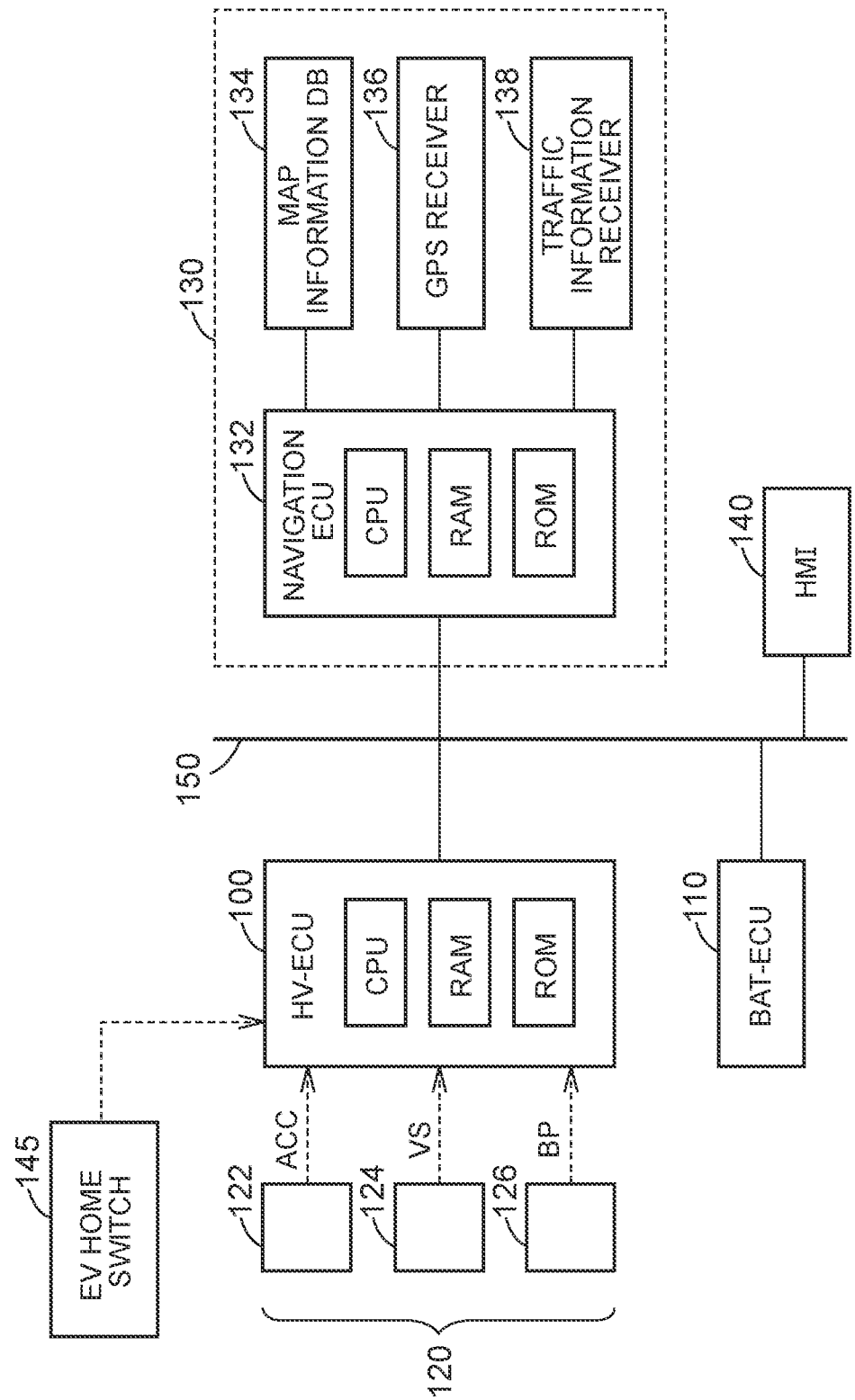
FIG. 2 is a block diagram illustrating a detailed configuration of an HV-ECU, various sensors, and a navigation device which are mounted in the hybrid vehicle.

FIG. 2 is a block diagram illustrating detailed configurations of the HV-ECU 100, various sensors 120, and the navigation device 130 which are illustrated in FIG. 1. The HV-ECU 100, the BAT-ECU 110, the navigation device 130, and the HMI device 140 are configured to communicate with each other via a controller area network (CAN) 150.

The various sensors 120 include, for example, an accelerator pedal sensor 122, a vehicle speed sensor 124, and a brake pedal sensor 126. The accelerator pedal sensor 122 detects an amount of depression of an accelerator pedal (hereinafter also referred to as an "accelerator depression amount") by a user. The vehicle speed sensor 124 detects a vehicle speed VS of the vehicle 1. The brake pedal sensor 126 detects an amount of depression of a brake pedal BP by a user. These sensors output the detection results to the HV-ECU 100.

The EV home switch 145 is a switch which is used for a user to request execution of "EV home control" (EV priority control). EV home control is control of suppressing activation of the engine 10 more to perform EV traveling (traveling using power of the second MG 30 with the engine 10 stopped) as much as possible when the vehicle 1 travels in an area (hereinafter also referred to as a "home area") within a predetermined distance α (for example, 2 km) from a user's home or an area (hereinafter also referred to as a "destination area") within a predetermined distance α from a destination of the vehicle 1 than when the vehicle 1 travels in an area other than the home area and the destination area. A user can select which of the home area, the destination area, and both the home area and the destination area should be set as an execution target area (hereinafter also referred to as a "specific area") of the EV home control by operating the EV home switch 145 or the like.

The vehicle 1 can travel alternatively in the EV traveling and HV traveling in which the vehicle travels by activation of the engine 10. When a user selects execution of the EV home control by operating the EV home switch 145, activation of the engine 10 is suppressed more in the specific area (the home area or the destination area) than when execution of the EV home control is not selected. Accordingly, in the specific area, the EV traveling is preferentially performed, and thus the vehicle 1 can travel in the specific area without the engine 10 generating noise.

The HV-ECU 100 includes a central processing unit (CPU), a read only memory (ROM) that stores processing programs or the like, a random access memory (RAM) that temporarily stores data, and input and output ports (not illustrated) that are used to input and output various signals, and performs a predetermined arithmetic operation based on information stored in a memory (the ROM and the RAM) or information from various sensors 120. The HV-ECU 100 controls devices such as the engine 10, the PCU 50, and the HMI device 140 based on the arithmetic operation result.

The HV-ECU 100 executes "pre-change control" (which means "predicted SOC control") as control for supporting energy-saving driving of the vehicle 1. Pre-change control is control of determining whether a control target section satisfying predetermined conditions is present on a scheduled traveling route of the vehicle 1 using information acquired from the navigation device 130 and changing a SOC (state of charge) of the power storage device in advance depending on the control target section before the vehicle enters the control target section when the control target section is present. The pre-change control will be described in detail later.

The BAT-ECU 110 includes a CPU, a ROM, a RAM, and input and output ports (none of which is illustrated), and calculates an SOC of the power storage device 60 based on detected values of input and an output current and/or voltage of the power storage device 60. For example, an SOC expresses a ratio of a current amount of stored power to a full capacity of the power storage device 60 in percentage. The BAT-ECU 110 outputs the calculated SOC to the HV-ECU 100. The HV-ECU 100 may calculate the SOC.

The navigation device 130 includes a navigation ECU 132, a map information database (DB) 134, a Global Positioning System (GPS) receiver 136, and a traffic information receiver 138.

The map information DB 134 is constituted by a hard disk drive (HDD) or the like and stores map information. Map information includes data on "nodes" indicating intersections or dead ends, "links (sections)" connecting the nodes, and "facilities" (such as buildings or parking lots) disposed along the links. The map information includes position information of each node, distance information of each link and gradient information of each link.

The GPS receiver 136 acquires a current position of the vehicle 1 based on signals (radio waves) from GPS satellites (not illustrated) and outputs a signal indicating the current position of the vehicle 1 to the navigation ECU 132.

The traffic information receiver 138 receives road traffic information (for example, VICS (registered trademark) information) which is provided by FM multiplex broadcasting or the like. Road traffic information includes at least congestion information and may further include traffic regulation information and parking lot information. The road traffic information is updated, for example, every five minutes.

The navigation ECU 132 includes a CPU, a ROM, a RAM, and input and output ports (not illustrated), and outputs a current position of the vehicle 1 and map information and congestion information around the current position to the HMI device 140 and the HV-ECU 100 based on a variety of information or signals received from the map information DB 134, the GPS receiver 136 and the traffic information receiver 138.

When a destination of the vehicle 1 is input through the HMI device 140 by a user, the navigation ECU 132 retrieves a route from the current position of the vehicle 1 to the destination (a scheduled traveling route) based on the map information DB 134. The scheduled traveling route includes a set of nodes and links from the current position of the vehicle 1 to the destination. The navigation ECU 132 outputs the retrieval result (a set of nodes and links) from the current position of the vehicle 1 to the destination to the HMI device 140.

The navigation ECU 132 outputs map information and road traffic information (hereinafter also simply referred to as "scheduled traveling route information") within a predetermined range (for example, about 10 km) from the current position on the scheduled traveling route to the HV-ECU 100 in response to a request from the HV-ECU 100. The scheduled traveling route information is divided into a plurality of sections (links).

The HMI device 140 is a device that provides a user with information for supporting driving of the vehicle 1. The HMI device 140 is typically a display (a visual information display) disposed in a vehicle interior of the vehicle 1 and also includes a speaker (an auditory information output device). The HMI device 140 provides a user with a variety of information by outputting visual information (such as graphic information or text information), auditory information (such as voice information or sound information), and the like.

The HMI device 140 serves as a display of the navigation device 130. That is, the HMI device 140 receives the current position of the vehicle 1 and map information and congestion information around the current position from the navigation device 130 via the CAN 150, and displays the current position of the vehicle 1 along with the map information and congestion information around the current position of the vehicle 1.

The HMI device 140 also serves as a touch panel which can be operated by a user, and a user can change a scale of a map which is displayed or input a destination of the vehicle 1 by touching the touch panel. When a destination is input through the HMI device 140, information of the destination is transmitted to the navigation device 130 via the CAN 150.

The HV-ECU 100 requires the navigation ECU 132 to output the scheduled traveling route information when a predetermined plan updating time arrives. The navigation ECU 132 outputs the scheduled traveling route information to the HV-ECU 100 in response to a request from the HV-ECU 100. When the scheduled traveling route information is received from the navigation ECU 132, the HV-ECU 100 retrieves a control target section on the scheduled traveling route based on the received scheduled traveling route information and executes the pre-change control when a control target section is present on the scheduled traveling route.

The HV-ECU 100 executes the EV home control when a user selects execution of the EV home control by operating the EV home switch 145 and the current position of the vehicle 1 is included in a specific area (a home area or a destination area). Specifically, the HV-ECU 100 sets an "engine start threshold value Peth" which will be described later (see Step S35 of FIG. 3 which will be described later or the like) to be a predetermined value greater than a normal value when the EV home control is not executed in comparison with a case in which the current position of the vehicle 1 is not included in the specific area. Accordingly, the EV traveling has priority in the specific area and the vehicle 1 can travel in the specific area without the engine 10 generating noise.

Traveling control of the vehicle 1 which is performed by the HV-ECU 100 will be first described below before describing the pre-change control in detail.

Figure 3:
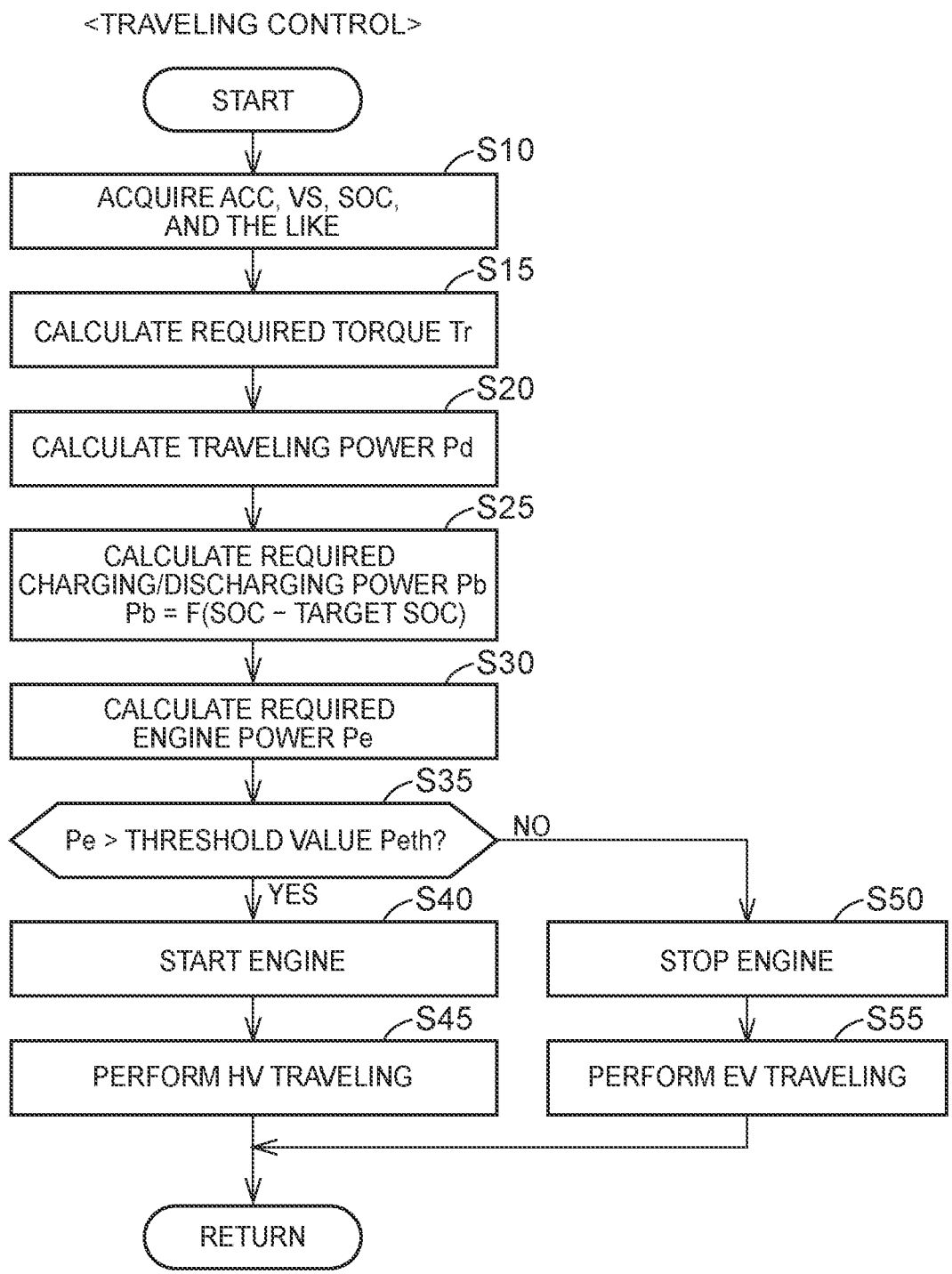
FIG. 3 is a flowchart illustrating a routine of traveling control which is performed by the HV-ECU.

FIG. 3 is a flowchart illustrating a routine of the traveling control which is performed by the HV-ECU 100. A series of processes illustrated in the flowchart is repeatedly performed at predetermined time intervals, for example, when a system switch of the vehicle is turned on.

The HV-ECU 100 acquires detected values of the accelerator depression amount ACC and the vehicle speed VS from the accelerator pedal sensor 122 and the vehicle speed sensor 124 and acquires the SOC of the power storage device 60 from the BAT-ECU 110 (Step S10).

Subsequently, the HV-ECU 100 calculates a required torque Tr for the vehicle 1 based on the acquired detected values of the accelerator depression amount ACC and the vehicle speed VS (Step S15). For example, a map indicating a relationship between the accelerator depression amount ACC, the vehicle speed VS, and the required torque Tr can be prepared in advance and stored as a map in the ROM of the HV-ECU 100, and the required torque Tr can be calculated based on the detected values of the accelerator depression amount ACC and the vehicle speed VS using the map. The HV-ECU 100 calculates traveling power Pd (a required value) for the vehicle 1 by multiplying the calculated required torque Tr by the vehicle speed VS (Step S20).

Subsequently, the HV-ECU 100 calculates a required charging/discharging power Pb for the power storage device 60 (Step S25). The required charging/discharging power Pb is calculated based on a difference ΔSOC between an SOC (an actual value) of the power storage device 60 and a target thereof. When the required charging/discharging power Pb has a positive value, it represents that charging is required for the power storage device 60. When the required charging/discharging power Pb has a negative value, it represents that discharging is required for the power storage device 60.

Figure 4:
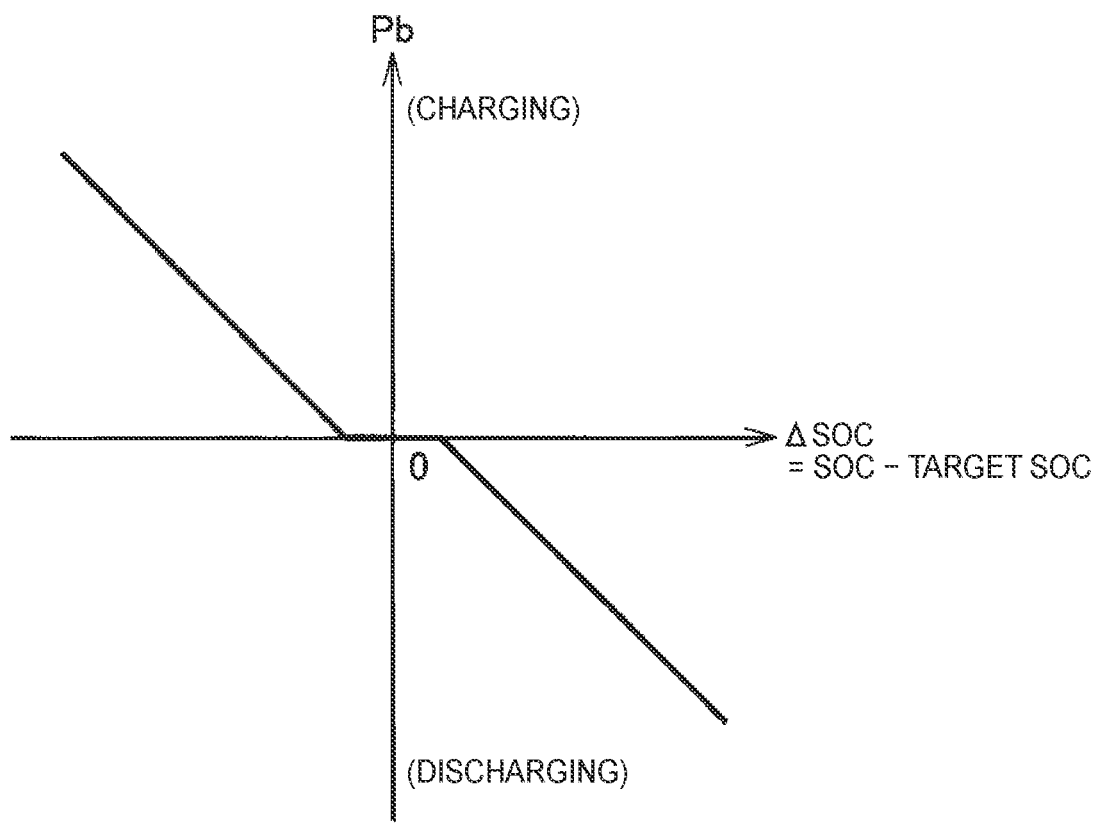
FIG. 4 is a diagram illustrating an example of a method of calculating a required charging/discharging power for a power storage device which is mounted in the hybrid vehicle.

FIG. 4 is a diagram illustrating an example of a method of calculating the required charging/discharging power Pb for the power storage device 60. When the difference ΔSOC between the SOC (the actual value) of the power storage device 60 and the target SOC indicating a control target of the SOC has a positive value (SOC>target SOC), the required charging/discharging power Pb has a negative value (discharging is required) and the absolute value of the required charging/discharging power Pb increases as the absolute value of the difference ΔSOC increases. On the other hand, when the difference ΔSOC has a negative value (SOC<target SOC), the required charging/discharging power Pb has a positive value (charging is required) and the absolute value of the required charging/discharging power Pb increases as the absolute value of the difference ΔSOC increases. In this example, there is provided a dead zone in which the required charging/discharging power Pb is set to 0 when the absolute value of the difference ΔSOC is small.

Referring to FIG. 3 again, as expressed by Equation (1), the HV-ECU 100 calculates a sum of the traveling power Pd calculated in Step S20, the required charging/discharging power Pb calculated in Step S25, and a system loss Ploss as a required engine power Pe required for the engine 10 (Step S30).

$$Pe = Pd + Pb + Ploss \qquad (1)$$

Subsequently, the HV-ECU 100 determines whether the calculated required engine power Pe is higher than a predetermined engine start threshold value Peth (Step S35). The engine start threshold value Peth is set to a value at which the engine 10 can be operated with operation efficiency higher than a predetermined operation efficiency.

When it is determined in Step S35 that the required engine power Pe is higher than the threshold value Peth (YES in Step S35), the HV-ECU 100 controls the engine 10 such that the engine 10 is started (Step S40). When the engine 10 is already operating, this step is skipped. Then, the HV-ECU 100 controls the engine 10 and the PCU 50 such that the vehicle 1 travels using output powers from both the engine 10 and the second MG 30. That is, the vehicle 1 performs hybrid traveling (HV traveling) using the output powers of the engine 10 and the second MG 30 (Step S45).

On the other hand, when it is determined in Step S35 that the required engine power Pe is equal to or lower than the threshold value Peth (NO in Step S35), the HV-ECU 100 controls the engine 10 such that the engine 10 is stopped (Step S50). When the engine 10 is already stopped, this step is skipped. Then, the HV-ECU 100 controls the PCU 50 such that the vehicle 1 travels using only the output power from the second MG 30. That is, the vehicle 1 performs electric motor traveling (EV traveling) using only the output power of the second MG 30 (Step S55).

As described above, when the EV home control is executed, the engine start threshold value Peth increases by a predetermined value from a normal value when the EV home control is not executed. Accordingly, activation of the engine 10 is suppressed.

Although not separately illustrated in the drawing, the HV-ECU 100 controls the engine 10 such that the engine 10 is forcibly started and performs forcible charging of the power storage device 60 using the first MG 20 even if the required engine power Pe is equal to or lower than the engine start threshold value Peth when the SOC of the power storage device 60 decreases to a lower limit value SL. On the other hand, when the SOC of the power storage device 60 increases to an upper limit value SU, the HV-ECU 100 suppresses charging of the power storage device 60 by setting an upper limit power Win indicating an upper limit value of an input power to the power storage device 60 to 0 or the like.

When the actual SOC is higher than the target SOC (ΔSOC>0), it can be understood that the required charging/discharging power Pb has a negative value and thus it is more difficult to start the engine 10 because the required engine power Pe is lower than when the SOC is controlled to the target SOC. As a result, discharging of the power storage device 60 is promoted and the SOC exhibits a decreasing tendency.

On the other hand, when the actual SOC is lower than the target SOC (ΔSOC<0), it can be understood that the required charging/discharging power Pb has a positive value and thus it is easier to start the engine 10 because the required engine power Pe is higher than that when the SOC is controlled to the target SOC. As a result, charging of the power storage device 60 is promoted and the SOC exhibits an increasing tendency.

Details of the pre-change control (congestion SOC control) which is performed by the HV-ECU 100 will be described below. The HV-ECU 100 according to this embodiment is configured to execute "congestion SOC control" as the pre-change control.

The congestion SOC control is control of determining whether a target congested section satisfying predetermined conditions is present on the scheduled traveling route of the vehicle 1 using the scheduled traveling route information acquired from the navigation device 130 and increasing the SOC of the power storage device in advance before the vehicle enters the target congested section. When the vehicle 1 travels in the target congested section, the traveling power is small, and thus the EV traveling becomes active, and the SOC decreases from Sn. However, since the SOC of the power storage device 60 increases in advance before the vehicle enters the target congested section by the congestion SOC control, the SOC is prevented from decreasing to a lower limit SL (see FIG. 5) or less during traveling in the target congested section (an underflow of the SOC) and forcible charging of the power storage device 60 in a state in which an operation efficiency of the engine 1 is low is prevented. Forcible charging is control of charging the power storage device 60 using the first MG 20 by forcibly starting the engine 10 even if the engine 10 cannot operate at an optimal operating point when the SOC decreases to the lower limit SL or lower.

Figure 5:
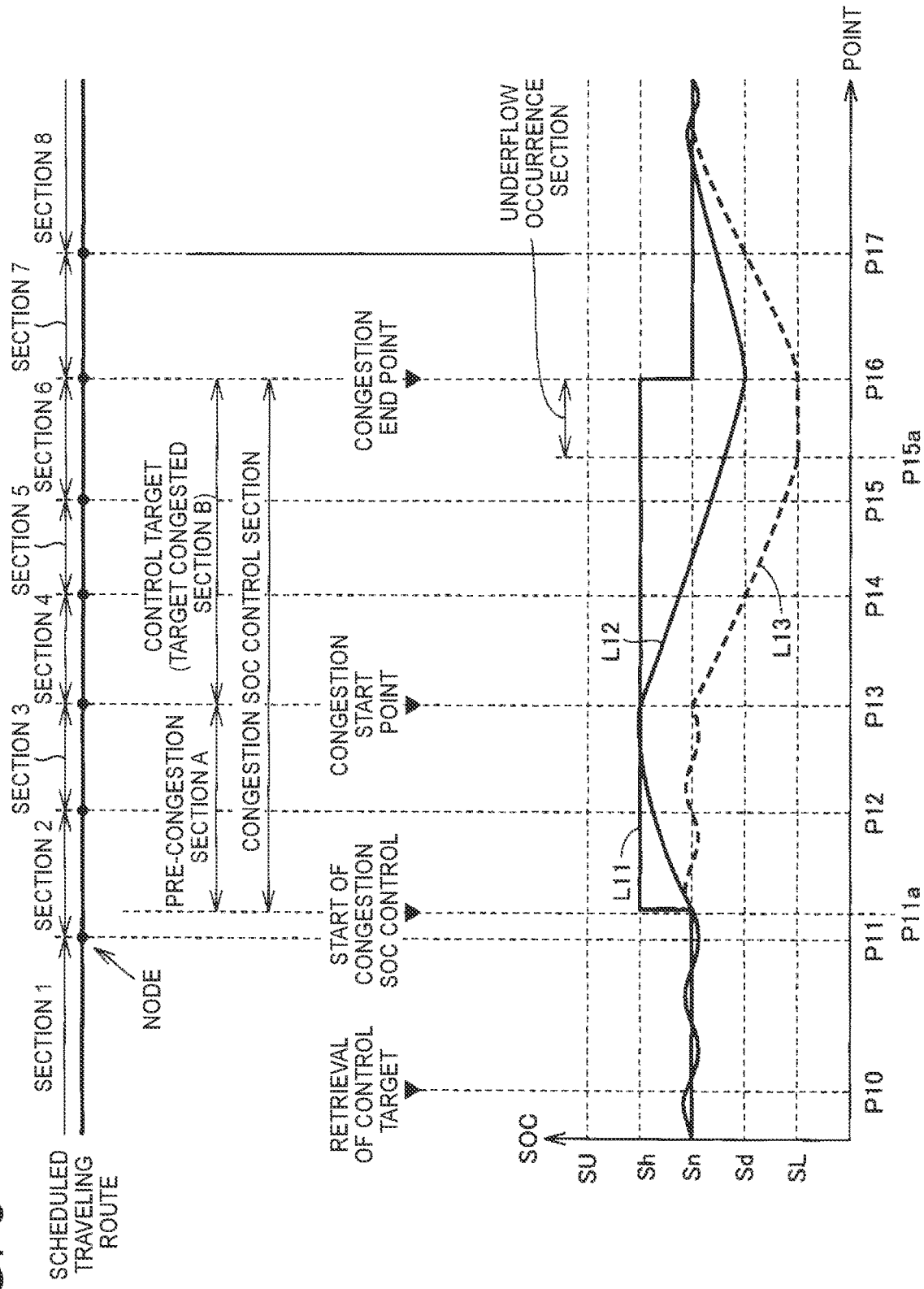
FIG. 5 is a diagram illustrating an example of a target SOC of the power storage device and a variation in SOC when congestion SOC control is executed in the hybrid vehicle.

FIG. 5 is a diagram illustrating an example of the target SOC of the power storage device 60 and a variation in SOC when the congestion SOC control is executed. In FIG. 5, the horizontal axis represents points on the scheduled traveling route of the vehicle 1, and the vertical axis represents the SOC of the power storage device 60. A solid line L11 denotes a target SOC of the power storage device 60. A solid line L12 denotes a change in SOC when the congestion SOC control is executed, and a dotted line L13 denotes a change in SOC when the congestion SOC control is not performed as a comparative example. In the example illustrated in the drawing, sections 1 to 8 (links 1 to 8) of the scheduled traveling route are illustrated. In this example, it is assumed that sections 1 to 8 are level roads.

The HV-ECU 100 acquires a current position of the vehicle 1, scheduled traveling route information, and road traffic information (congestion information) from the navigation device 130 and retrieves a section (hereinafter also referred to as "target congested section B") which is a control target of the congestion SOC control based on the acquired information. For example, when congestion satisfying predetermined conditions (for example, a condition that a congestion length be equal to or greater than a predetermined length) occurs within a predetermined range (for example, 10 km) from the current position of the vehicle 1 on the scheduled traveling route, the HV-ECU 100 specifies the section as target congested section B. In FIG. 5, target congested section B is retrieved at point P10, and sections 4 to 6 are specified as target congested section B.

The HV-ECU 100 sets the target SOC of the power storage device 60 to a normal value Sn at the time of a normal operation (when the congestion SOC control is not executed; for example, see section 1 or sections 7 and 8). When the vehicle 1 enters target congested section B (sections 4 to 6) with the SOC of the power storage device 60 controlled to Sn, the traveling power in target congested section B is small, and thus the EV traveling becomes active, and the SOC decreases from Sn (the dotted line L13). When the SOC at point P15a decreases to the lower limit SL during traveling in target congested section B, the engine 10 is forcibly started and forcible charging of the power storage device 60 using the first MG 20 is performed. Such forcible charging is performed even when the vehicle stops in target congested section B (in a situation in which the engine 10 does not operate at an optimal operating point and the operation efficiency of the engine 10 is low) and thus the fuel efficiency deteriorates.

Therefore, the HV-ECU 100 specifies a section from point P11a a predetermined distance before a start point P13 of target congested section B to the start point P13 of target congested section B as "pre-congestion section A." When the vehicle 1 reaches the start point P11a of pre-congestion section A, the HV-ECU 100 changes the target SOC from Sn to Sh which is higher than Sn (the solid line L11). Then, the SOC becomes lower than the target SOC (ΔSOC<0), charging of the power storage device 60 is promoted as described above, and the SOC increases (see the solid line L12 in sections 2 and 3).

A section including pre-congestion section A and target congested section B is an execution section of the congestion SOC control (hereinafter also referred to as a "congestion SOC control section"). When the vehicle 1 travels in the congestion SOC control section, the HV-ECU 100 executes the congestion SOC control and sets the target SOC to Sh which is higher than the normal value Sn.

When the vehicle 1 reaches an end point P16 of target congested section B, the HV-ECU 100 ends the congestion SOC control.

As described above, the vehicle 1 according to this embodiment is configured to execute the congestion SOC control (pre-change control) and the EV home control (EV priority control). In the vehicle 1, when the congestion SOC control and the EV home control are simultaneously executed, there is a likelihood that the SOC of the power storage device 60 will not be changed according to the purpose of the congestion SOC control and a supporting effect using the congestion SOC control cannot be satisfactorily achieved.

Specifically, the congestion SOC control is control of making it easy to start the engine 10 by increasing the target SOC of the power storage device 60 before the vehicle enters target congested section B, and the EV home control is control of making it difficult to start the engine 10 by increasing the engine start threshold value Peth in a specific area. Accordingly, when the target area of the EV home control (the home area or the destination area) is included in a part of the congestion SOC control section (pre-congestion section A and target congested section B), the congestion SOC control and the EV home control may interfere with each other. That is, when the EV home control is executed during execution of the congestion SOC control, there is a likelihood that power generation using the power of the engine 10 cannot be performed and the SOC of the power storage device 60 cannot be satisfactorily increased before the vehicle enters target congested section B. Accordingly, when the SOC decreases to the lower limit SL during traveling in target congested section B, the above-mentioned forcible charging is performed and there is concern that the fuel efficiency will deteriorate.

In consideration of the above-mentioned circumstances, the HV-ECU 100 according to this embodiment is configured not to execute the EV home control during execution of the congestion SOC control. Accordingly, it is possible to prevent the congestion SOC control and the EV home control from interfering with each other.

Figure 6:
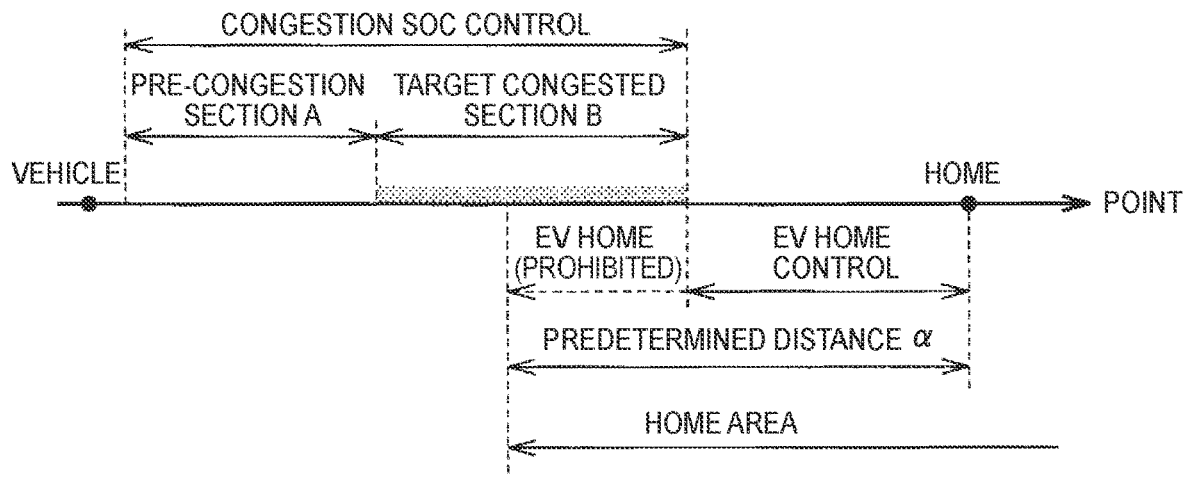
FIG. 6 is a (first) diagram illustrating an example of a relationship between the congestion SOC control and EV home control in the hybrid vehicle.
Figure 7:
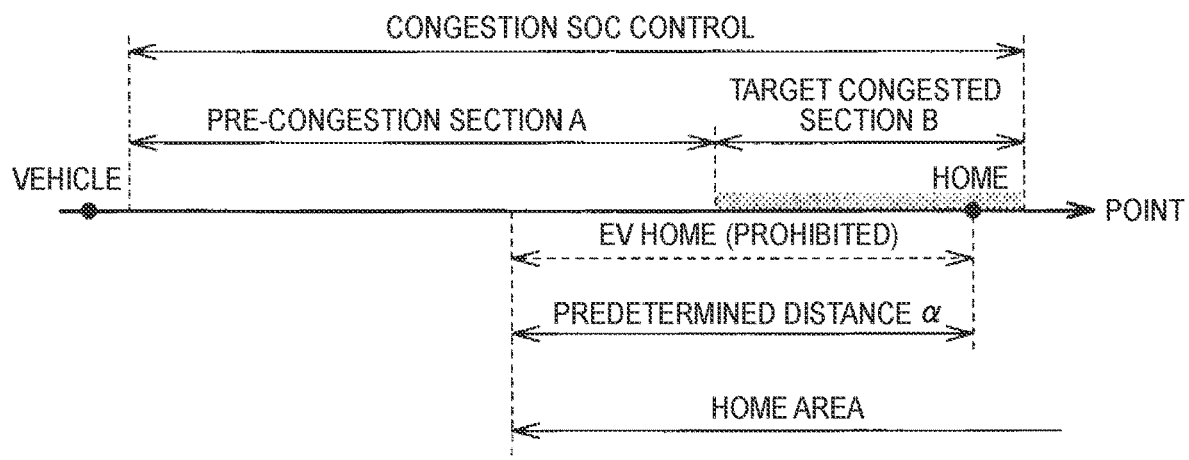
FIG. 7 is a (second) diagram illustrating an example of a relationship, different from that illustrated in FIG. 6, between the congestion SOC control and the EV home control.
Figure 8:
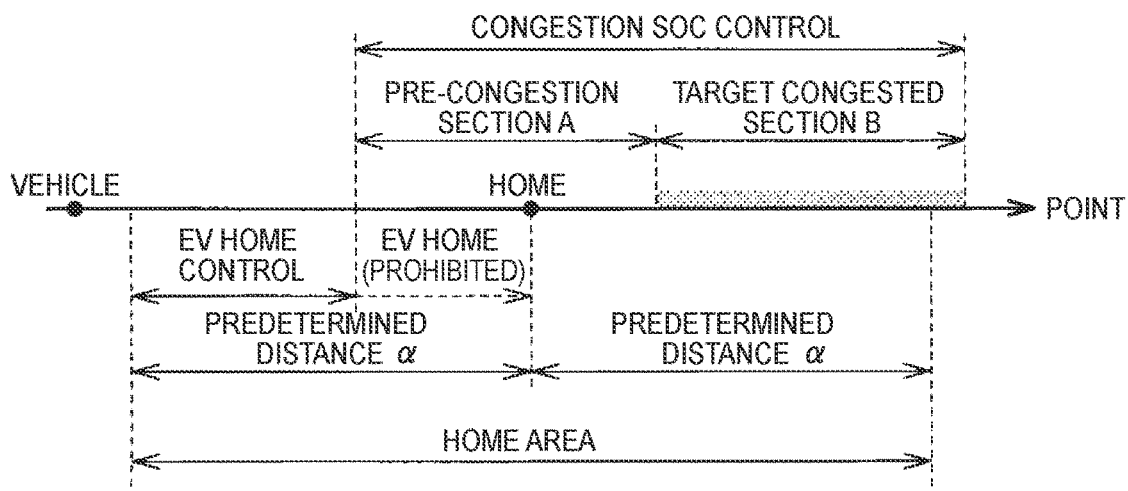
FIG. 8 is a (third) diagram illustrating an example of a relationship, different from those illustrated in FIGS. 6 and 7, between the congestion SOC control and the EV home control.

FIGS. 6 to 8 are diagrams illustrating examples of a relationship between the congestion SOC control and the EV home control when the vehicle 1 travels to home.

FIG. 6 illustrates a relationship when target congested section B is present before home from the viewpoint of the vehicle 1 and the vehicle 1 enters the congestion SOC control section earlier than the home area. In this case, when the vehicle 1 enters the congestion SOC control section (pre-congestion section A), the congestion SOC control is started. Consequently, execution of the EV home control is prohibited. Accordingly, even when execution conditions of the EV home control are satisfied due to entering of the vehicle 1 into the home area thereafter, the EV home control is not started during execution of the congestion SOC control and the congestion SOC control is continuously executed.

When the vehicle 1 passes through an end point of target congested section B, the congestion SOC control ends. Consequently, prohibition of the EV home control is released. Accordingly, until the vehicle 1 arrives as home after passing through the end point of target congested section B, the EV home control is executed.

FIG. 7 illustrates a relationship when home is present in target congested section B and the vehicle 1 enters the congestion SOC control section earlier than the home area. In this case, similarly to FIG. 6, when the vehicle 1 enters the congestion SOC control section (pre-congestion section A), the congestion SOC control is started and execution of the EV home control is prohibited. Accordingly, even when the execution conditions of the EV home control are satisfied due to entering of the vehicle 1 into the home area thereafter, the EV home control is not started during execution of the congestion SOC control and the congestion SOC control is continuously executed.

Since home is present in target congested section B, the congestion SOC control is executed until the vehicle 1 arrives at home thereafter. Accordingly, in the case illustrated in FIG. 7, the EV home control is not executed until the vehicle 1 arrives at home.

FIG. 8 illustrates a relationship when home is present in pre-congestion section A and the vehicle 1 enters the home area earlier than pre-congestion section A. In this case, when the execution conditions of the EV home control are satisfied due to entering of the vehicle 1 into the home area, the EV home control is started. Thereafter, when execution conditions of the congestion SOC control are satisfied due to entering of the vehicle 1 into the pre-congestion section A during execution of the EV home control, the congestion SOC control is started. Consequently, execution of the EV home control is prohibited. Accordingly, execution of the EV home control is stopped.

Since home is present in pre-congestion section A, the congestion SOC control is executed until the vehicle 1 arrives at home thereafter. Accordingly, in the case illustrated in FIG. 8, the EV home control is not executed until the vehicle 1 arrives at home.

As described above, when the execution conditions of the EV home control are satisfied during execution of the congestion SOC control, the HV-ECU 100 according to this embodiment continues to execute the congestion SOC control without starting execution of the EV home control (see FIGS. 6 and 7). When the execution conditions of the congestion SOC control are satisfied during execution of the EV home control, the HV-ECU 100 stops execution of the EV home control and starts execution of the congestion SOC control (see FIG. 8). In this way, by executing the congestion SOC control with priority over the EV home control, it is possible to prevent the congestion SOC control and the EV home control from interfering with each other and to prevent forcible charging from being performed before arriving at home.

A routine of the congestion SOC control and a routine of the EV home control will be sequentially described below.

Figure 9:
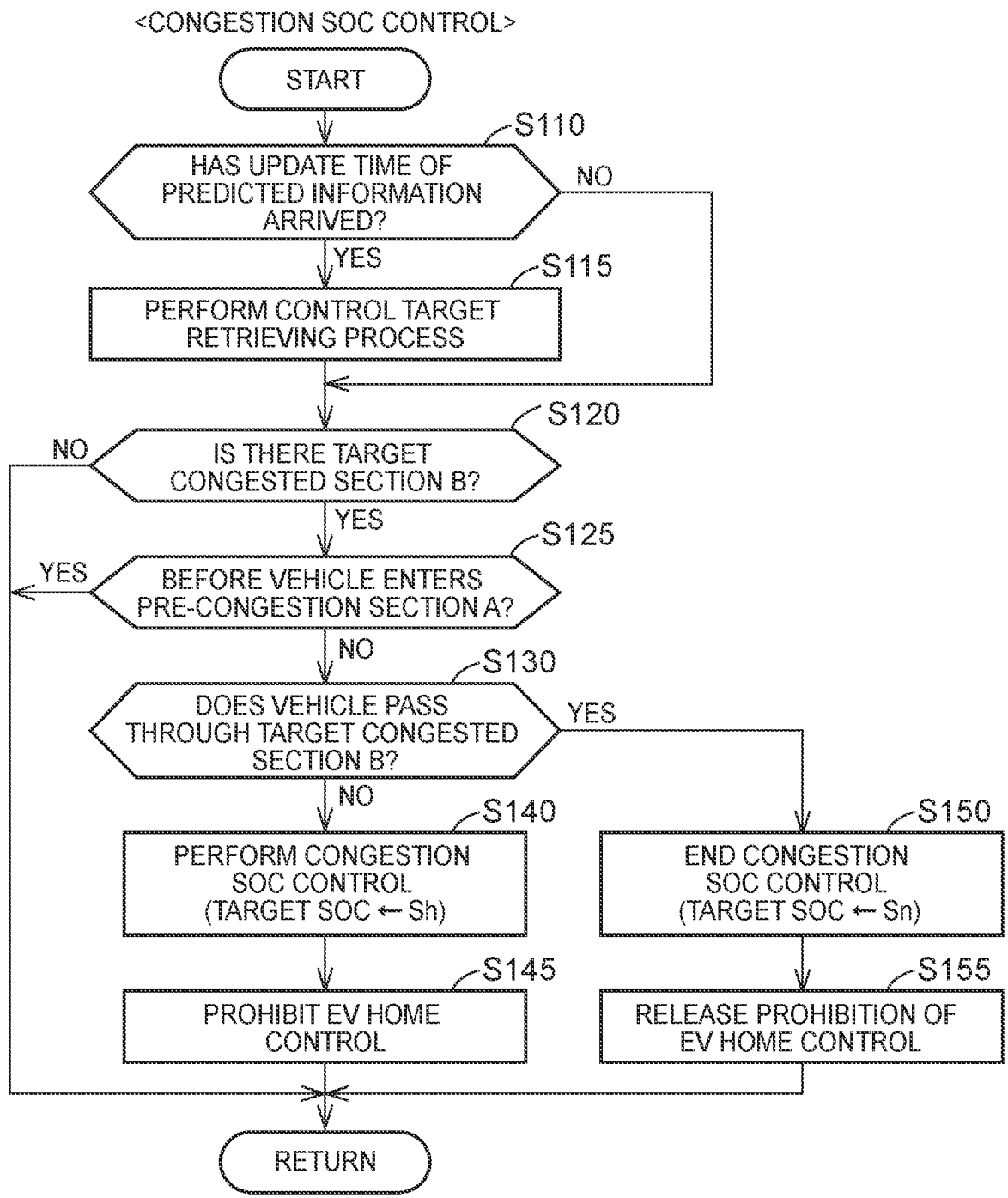
FIG. 9 is a flowchart illustrating an example of a routine of the congestion SOC control.

FIG. 9 is a flowchart illustrating an example of the routine of the congestion SOC control which is performed by the HV-ECU 100. A series of processes illustrated in the flowchart are repeatedly performed at predetermined time intervals, for example, when a system switch of the vehicle 1 or the like is turned on.

The HV-ECU 100 determines whether an update time of predicted information has arrived (Step S110). As described above, the predicted information includes map information and road traffic information from the current position to a point within a predetermined range (for example, 10 km) on a scheduled traveling route. Examples of the update time of the predicted information include a time at which a traveling route of the vehicle 1 is changed (when the vehicle 1 departs from the scheduled traveling route), a time at which road traffic information (congestion information) is updated, a time at which a predetermined time (for example, one minute) has elapsed, a time at which the vehicle travels a predetermined distance, and a time at which the vehicle 1 has passed through target congested section B.

When it is determined in Step S110 that the update time of the predicted information has arrived (YES in Step S110), the HV-ECU 100 performs a process of retrieving target congested section B (a congested section satisfying predetermined conditions) as a control target based on scheduled traveling route information and road traffic information (congestion information) acquired from the navigation device 130 (Step S115). When it is determined in Step S110 that the update time of the predicted information has not arrived (NO in Step S110), the HV-ECU 100 performs the process of Step S120 without performing the process of Step S115.

Subsequently, the HV-ECU 100 determines whether target congested section B is present on the scheduled traveling route (Step S120). When it is determined in Step S120 that target congested section B is not present on the scheduled traveling route (NO in Step S120), the HV-ECU 100 restarts the routine without performing a subsequent series of processes.

When it is determined in Step S120 that target congested section B is present on the scheduled traveling route (YES in Step S120), the HV-ECU 100 determines whether the vehicle 1 has not yet entered pre-congestion section A (a section from a point a predetermined distance before the start point of target congested section B to a start point of target congested section B) (Step S125).

When it is determined in Step S125 that the vehicle 1 has not yet entered pre-congestion section A (YES in Step S125), the HV-ECU 100 restarts the routine without performing a subsequent series of processes.

When it is determined in Step S125 that the vehicle 1 has entered pre-congestion section A (NO in tep S125), the HV-ECU 100 determines whether the vehicle 1 has passed through the end point of target congested section B (Step S130).

When it is determined in Step S130 that the vehicle 1 has not passed through the end point of target congested section B (NO in Step S130), the vehicle 1 is traveling in the congestion SOC control section and thus the HV-ECU 100 executes the congestion SOC control (Step S140). Specifically, the HV-ECU 100 sets the target SOC to a value Sh which is higher than the normal value Sn. Accordingly, since charging of the power storage device 60 is promoted and forcible charging is less likely to be performed in the congestion SOC control section (particularly, target congested section B), it is possible to avoid deterioration in fuel efficiency.

With execution of the congestion SOC control, the HV-ECU 100 prohibits execution of the EV home control to prevent interference between the congestion SOC control and the EV home control (Step S145).

When it is determined in Step S130 that the vehicle 1 has passed through the end point of target congested section B (YES in Step S130), the HV-ECU 100 ends the congestion SOC control (Step S150). Specifically, the HV-ECU 100 sets the target SOC to the normal value Sn.

With end of the congestion SOC control, the HV-ECU 100 releases prohibition of the EV home control (Step S155).

Figure 10:
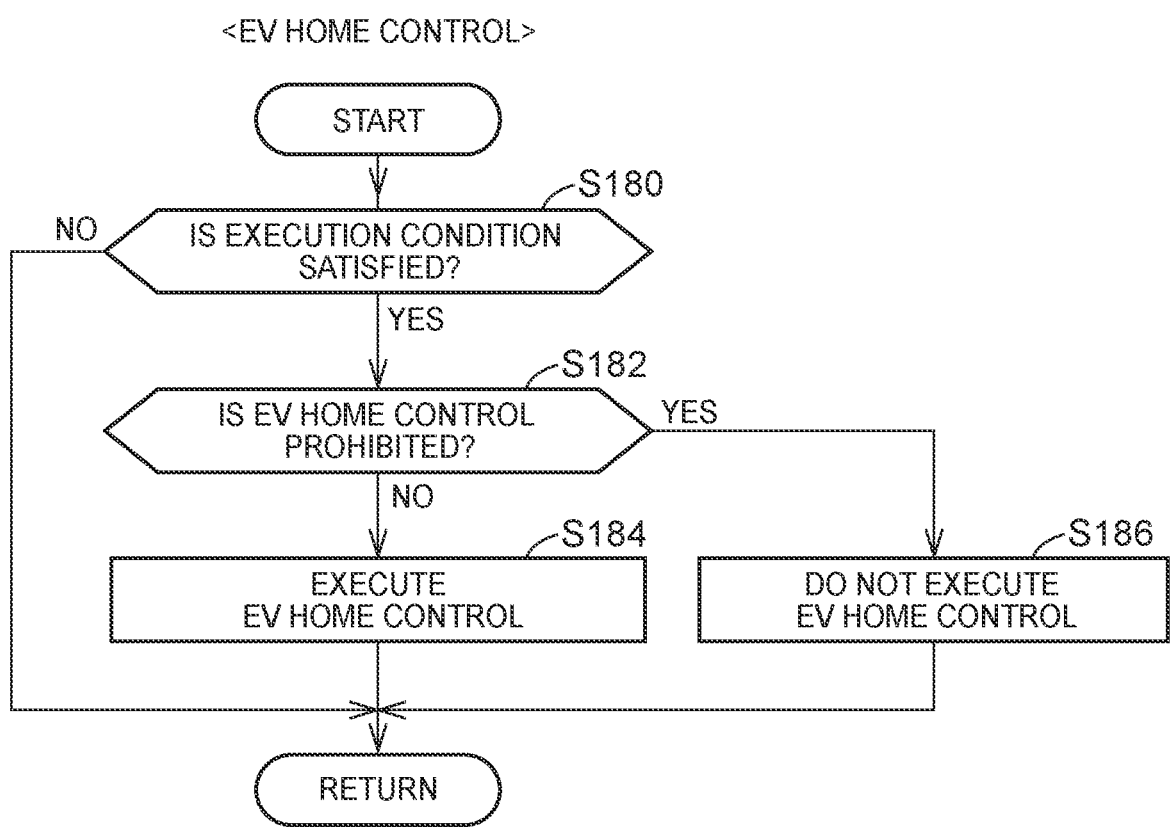
FIG. 10 is a flowchart illustrating an example of a routine of the EV home control.

FIG. 10 is a flowchart illustrating an example of a routine of the EV home control which is performed by the HV-ECU 100. A series of processes illustrated in the flowchart are repeatedly performed at predetermined time intervals, for example, when a system switch of the vehicle 1 or the like is turned on.

The HV-ECU 100 determines whether the execution conditions of the EV home control have been satisfied (Step S180). When a user selects execution of the EV home control by operating the EV home switch 145 and the current position of the vehicle 1 is included in a specific area (the home area or the destination area), the HV-ECU 100 determines that the execution conditions of the EV home control have been satisfied.

When it is determined in Step S180 that the execution conditions of the EV home control have not been satisfied (NO in Step S180), the HV-ECU 100 restarts the routine without performing a subsequent series of processes.

When it is determined in Step S180 that the execution conditions of the EV home control have been satisfied (YES in Step S180), the HV-ECU 100 determines whether execution of the EV home control is prohibited by the above-mentioned process of Step S145 illustrated in FIG. 9 (Step S182).

When it is determined in Step S182 that execution of the EV home control is not prohibited (NO in Step S182), the HV-ECU 100 executes the EV home control (Step S184). That is, the HV-ECU 100 increases the engine start threshold value Peth by a predetermined value from the normal value.

On the other hand, when it is determined in Step S182 that execution of the EV home control is prohibited (YES in Step S182), the HV-ECU 100 does not execute the EV home control Step S186). That is, the HV-ECU 100 sets the engine start threshold value Peth to the normal value. Accordingly, the congestion SOC control is executed with priority over the EV home control.

As described above, the HV-ECU 100 according to this embodiment is configured not to execute the EV home control during execution of the congestion SOC control. In this way, by executing the congestion SOC control with priority over the EV home control, it is possible to prevent the congestion SOC control and the EV home control from interfering with each other. As a result, it is possible to prevent the SOC of the power storage device 60 from not being changed according to the purpose of the congestion SOC control.

In the above-mentioned embodiment, a case in which the "congestion SOC control" is executed as the pre-change control has been described.

However, "downhill SOC control" which will be described below may be executed as the pre-change control, instead of or in addition to the "congestion SOC control." The HV-ECU 100 may not execute the EV home control during execution of the downhill SOC control. Therefore, the "downhill SOC control" will be described below as a modified example of this embodiment.

Details of the downhill SOC control as the pre-change control which is performed by the HV-ECU 100 will be described below.

The downhill SOC control is control of determining whether a target downhill section satisfying downhill extraction conditions is present on the scheduled traveling route of the vehicle 1 acquired from the navigation device 130 and decreasing the SOC of the power storage device 60 in advance before the vehicle enters the target downhill section when a target downhill section is present.

When the vehicle 1 travels in the target downhill section, it is conceived that the SOC of the power storage device 60 increases due to an increase in regenerative power of the second MG 30. However, since the SOC of the power storage device 60 decreases in advance before the vehicle enters the target downhill section by the downhill SOC control, the SOC is prevented from reaching an upper limit SU (see FIG. 11 which will be described later) during traveling in the target downhill section and a decrease in fuel efficiency due to waste of recoverable energy or deterioration due to overcharging of the power storage device 60 is prevented (see FIG. 11 which will be described later).

Figure 11:
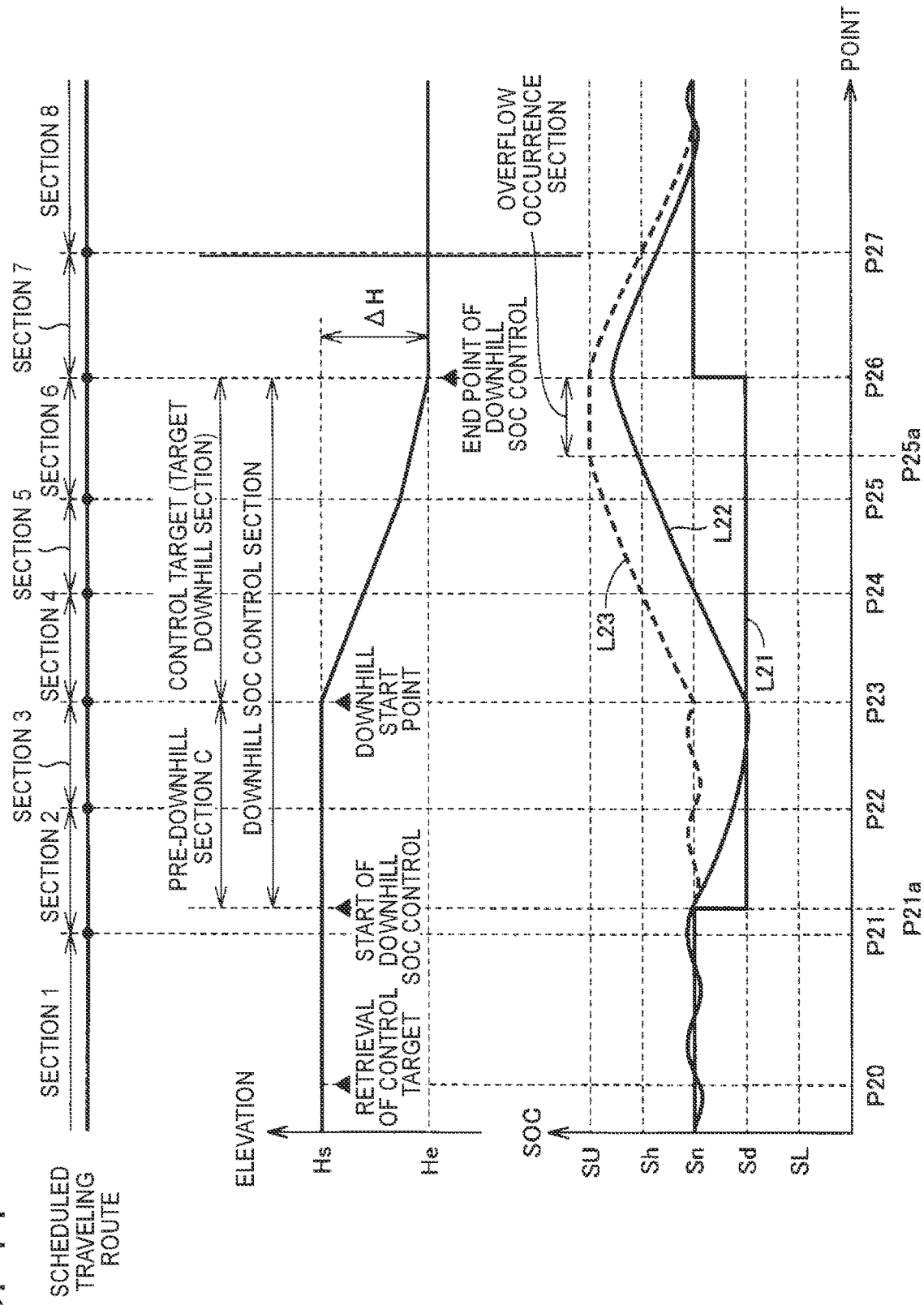
FIG. 11 is a diagram illustrating an example of a target SOC of the power storage device and a variation in SOC when downhill SOC control is executed.

FIG. 11 is a diagram illustrating an example of a target SOC of the power storage device 60 and a change in SOC when the downhill SOC control is executed. In FIG. 11, the horizontal axis represents points on the scheduled traveling route of the vehicle 1. In the example illustrated in FIG. 11, similarly to FIG. 5, sections 1 to 8 of the scheduled traveling route are illustrated. The vertical axis represents an elevation of a road in each section and the SOC of the power storage device 60. In the drawing, a line L21 denotes a target SOC of the power storage device 60. A line L22 denotes a change in SOC when the downhill SOC control is executed, and a dotted line L23 denotes a change in SOC when the downhill SOC control is not executed as a comparative example.

The HV-ECU 100 acquires a current position and a scheduled traveling route of the vehicle 1 and map information thereof from the navigation device 130 and performs a "control target retrieving process" of determining whether a target downhill section satisfying downhill extraction conditions (hereinafter also simply referred to as "target downhill section D") is present within a predetermined range (for example, 10 km) from the current position of the vehicle 1 on the scheduled traveling route. The downhill extraction conditions are set to, for example, a condition of a section from a start point of a downhill road with a large downhill gradient to a point immediately before a level road with a predetermined distance or more extend continuously and a section with a predetermined elevation or more and a predetermined distance or more.

FIG. 11 illustrates a case in which retrieval of target downhill section D at point P20 is performed and sections 4 to 6 are specified as target downhill section D. The HV-ECU 100 sets the target SOC of the power storage device 60 to a value Sn at the time of traveling normally (for example, section 1). When the vehicle 1 enters target downhill section D (sections 4 to 6) with the SOC of the power storage device 60 controlled to the value Sn, the power storage device 60 is charged due to regeneration of power by the second MG 30 in target downhill section D, and thus the SOC increases from the value Sn (the dotted line L23). Then, when the SOC reaches the upper limit SU during traveling in target downhill section D (point P25a), regenerative power generated by the second MG 30 is not stored in the power storage device 60 in spite of traveling in a downhill road (occurrence of overflow), recoverable energy is discarded, and deterioration of the power storage device 60 may be promoted.

Therefore, in the vehicle 1 according to this modified example, when the vehicle 1 reaches a point P21a a predetermined distance before the start point P23 of target downhill section D (sections 4 to 6), the HV-ECU 100 changes the target SOC to a value Sd which is lower than the value Sn (the line L21). Then, the SOC becomes higher than the target SOC ($\Delta SOC>0$), discharging of the power storage device 60 is promoted as described above, and the SOC decreases (the line L22).

The predetermined distance is set to a distance sufficient for the SOC to approach the value Sd until the vehicle 1 reaches the start point P23 of target downhill section D. In FIG. 11, the SOC decreases to the value Sd until the vehicle 1 reaches the start point P23 of target downhill section D. Accordingly, it is possible to prevent the SOC from reaching the upper limit SU during traveling in target downhill section D (sections 4 to 6) and to prevent a decrease in fuel efficiency due to wasting of recoverable energy and deterioration due to overcharging of the power storage device 60.

When the vehicle 1 reaches the end point P26 of target downhill section D, the HV-ECU 100 ends the downhill SOC control and returns the target SOC to the value Sn.

In the following description, a section from a point P21a (a start point of the downhill SOC control) at which the target SOC is changed from the value Sn to the value Sd to the start point P23 of target downhill section D is also referred to as "pre-downhill section C." A section (a section in which the target SOC is changed from the value Sn to the value Sd) including both pre-downhill section C and target downhill section D is also referred to as a "downhill SOC control section."

As described above, the vehicle 1 according to this modified example is configured to execute the downhill SOC control (the pre-change control) and the EV home control (the EV priority control). In the vehicle 1, when the downhill SOC control and the EV home control are simultaneously executed, there is concern that the SOC of the power storage device 60 will not be changed according to the purpose of the downhill SOC control.

Specifically, the downhill SOC control is control of making it difficult to start the engine 10 by decreasing the target SOC of the power storage device 60 in pre-downhill section C in preparation for an increase in SOC in target downhill section D. Accordingly, when the EV home control is executed during execution of the downhill SOC control, it is less likely to start the engine 10 in comparison with a supposed level of the downhill SOC control and there is a likelihood that the SOC of the power storage device 60 will decrease rapidly from the supposed level of the downhill SOC control. Accordingly, for example, when the SOC decreases to the lower limit SL during traveling in pre-downhill section C, the above-mentioned forcible charging is performed and there is concern that the fuel efficiency will deteriorate.

In consideration of the above-mentioned circumstances, the HV-ECU 100 according to this modified example is configured not to execute the EV home control during execution of the downhill SOC control. Accordingly, it is possible to prevent the SOC of the power storage device 60 from not being changed according to the purpose of the downhill SOC control (decreasing rapidly from the supposed level of the downhill SOC control).

Figure 12:
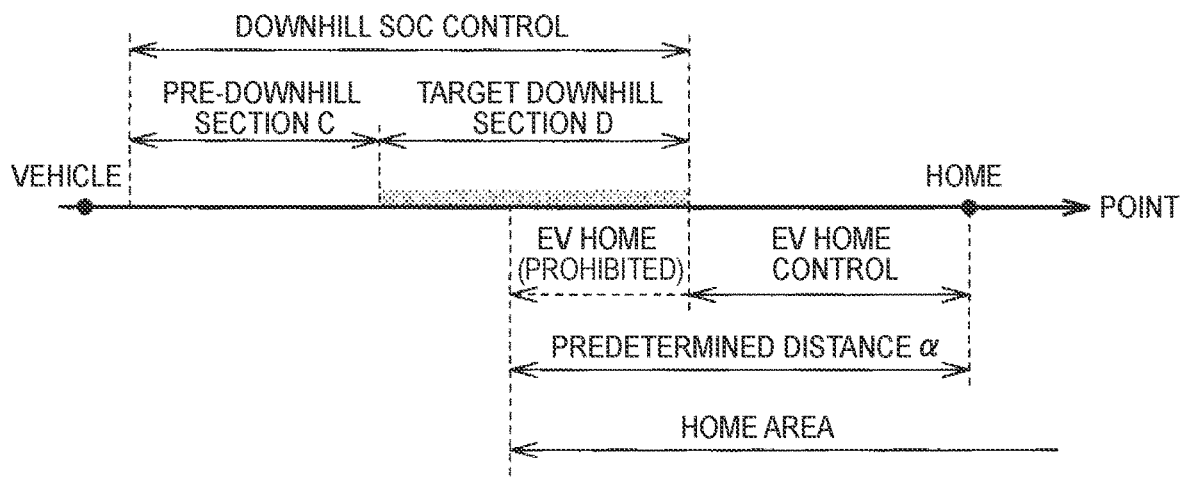
FIG. 12 is a (first) diagram illustrating an example of a relationship between the downhill SOC control and the EV home control.
Figure 13:
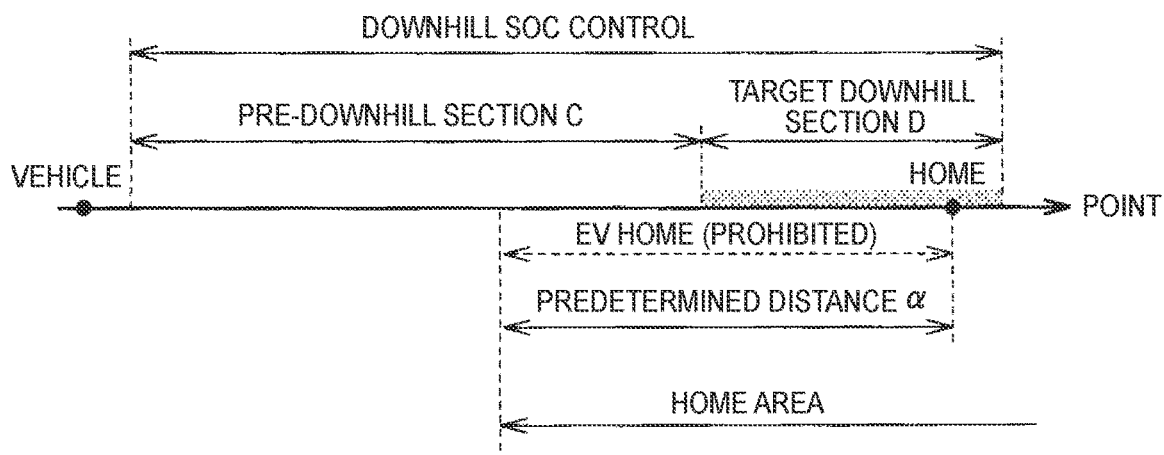
FIG. 13 is a (second) diagram illustrating an example of a relationship, different from that illustrated in FIG. 12, between the downhill SOC control and the EV home control.
Figure 14:
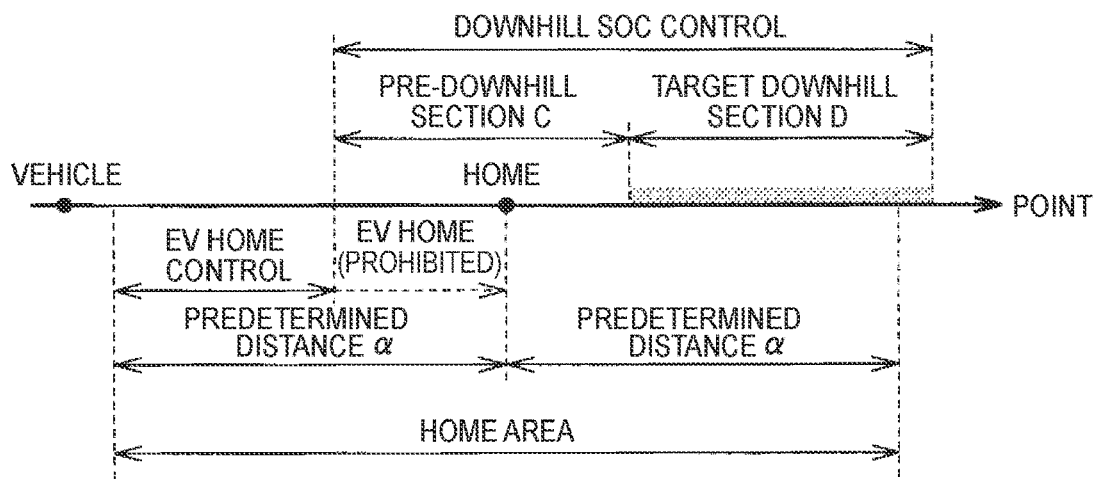
FIG. 14 is a (third) diagram illustrating an example of a relationship, different from those illustrated in FIGS. 12 and 13, between the downhill SOC control and the EV home control.

FIGS. 12 to 14 are diagrams illustrating examples of a relationship between the downhill SOC control and the EV home control when the vehicle 1 travels to home.

FIG. 12 illustrates a relationship when target downhill section D is present before home from the viewpoint of the vehicle 1 and the vehicle 1 enters the downhill SOC control section earlier than the home area. FIG. 13 illustrates a relationship when home is present in target downhill section D and the vehicle 1 enters the downhill SOC control section earlier than the home area. As illustrated in FIGS. 12 and 13, when the vehicle 1 enters the downhill SOC control section (pre-downhill section C), the downhill SOC control is started and execution of the EV home control is prohibited. Accordingly, even when execution conditions of the EV home control are satisfied due to entering of the vehicle 1 into the home area thereafter, the EV home control is not started during execution of the downhill SOC control and the downhill SOC control is continuously executed.

FIG. 14 illustrates a relationship when home is present in pre-downhill section C and the vehicle 1 earlier enters the home area than pre-downhill section C. In this case, when execution conditions of the EV home control are satisfied due to entering of the vehicle 1 into the home area, the EV home control is started. Thereafter, when the execution conditions of the downhill SOC control are satisfied due to entering of the vehicle 1 into pre-downhill section C during execution of the EV home control, the downhill SOC control is started. Consequently, execution of the EV home control is prohibited. Accordingly, execution of the EV home control is stopped.

As described above, when the execution conditions of the EV home control are satisfied during execution of the downhill SOC control, the HV-ECU 100 according to this modified example continues to execute the downhill SOC control without starting execution of the EV home control (see FIGS. 12 and 13). When the execution conditions of the downhill SOC control are satisfied during execution of the EV home control, the HV-ECU 100 stops execution of the EV home control and starts execution of the downhill SOC control (see FIG. 14). In this way, by executing the downhill SOC control with priority over the EV home control, it is possible to prevent the SOC of the power storage device 60 from not being changed according to the purpose of the downhill SOC control.

Figure 15:
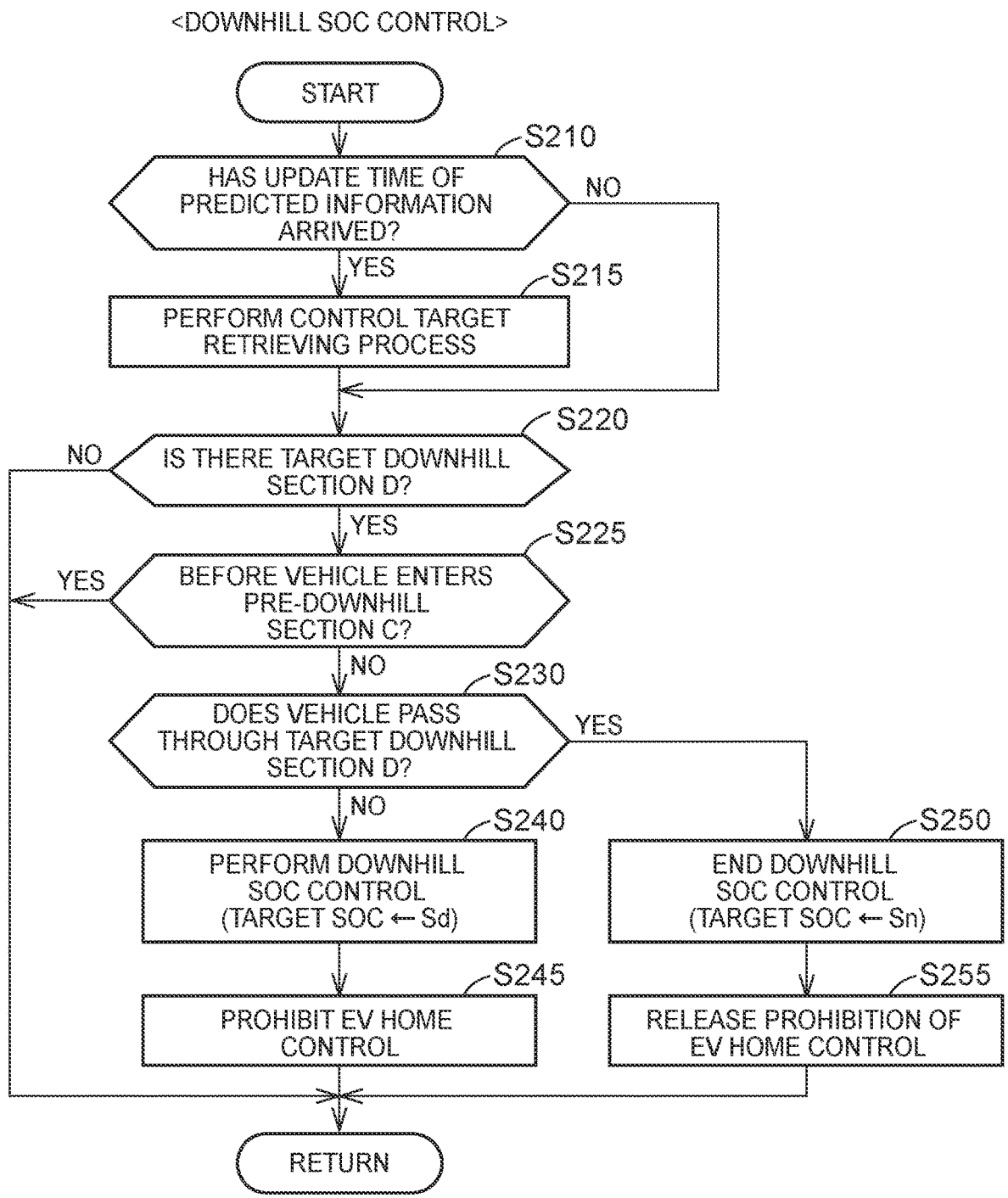
FIG. 15 is a flowchart illustrating an example of a routine of the downhill SOC control.

FIG. 15 is a flowchart illustrating an example of a routine of the downhill SOC control which is performed by the HV-ECU 100. A series of processes illustrated in the flowchart are repeatedly performed at predetermined time intervals, for example, when a system switch of the vehicle 1 or the like is turned on.

The HV-ECU 100 determines whether an update time of predicted information has arrived (step S210). This process is the same as the process of S110 in FIG. 9.

When it is determined in Step S210 that the update time of predicted information has arrived (YES in Step S210), the HV-ECU 100 performs a process of retrieving a control target (target downhill section D) based on scheduled traveling route information acquired from the navigation device 130 or the like (Step S215). When it is determined in Step S210 that the update time of predicted information has not arrived (NO in Step S210), the HV-ECU 100 performs the process of Step S220 without performing the process of Step S215.

Subsequently, the HV-ECU 100 determines whether target downhill section D (a downhill section satisfying downhill extraction conditions) is present on the scheduled traveling route (Step S220). When it is determined in Step S220 that target downhill section D is not present on the scheduled traveling route (NO in Step S220), the HV-ECU 100 restarts the routine without performing a subsequent series of processes.

When it is determined in Step S220 that target downhill section D is present on the scheduled traveling route (YES in Step S220), the HV-ECU 100 determines whether the vehicle 1 has not yet entered pre-downhill section C (a section from a point a predetermined distance before the start point of target downhill section D to the start point of target downhill section D) (Step S225).

When it is determined in Step S225 that the vehicle 1 has not yet entered pre-downhill section C (YES in Step S225), the HV-ECU 100 restarts the routine without performing a subsequent series of processes.

When it is determined in Step S225 that the vehicle 1 has entered pre-downhill section C (NO in Step S225), the HV-ECU 100 determines whether the vehicle 1 has passed through the end point of target downhill section D (Step S230).

When it is determined in Step S230 that the vehicle 1 has not passed through the end point of target downhill section D (NO in Step S230), the vehicle 1 is traveling in the downhill SOC control section and thus the HV-ECU 100 executes the downhill SOC control (Step S240). Specifically, the HV-ECU 100 sets the target SOC to a value Sd which is lower than the normal value Sn. Accordingly, it is possible to decrease the SOC of the power storage device 60 before the vehicle 1 enters target downhill section D.

With execution of the downhill SOC control, the HV-ECU 100 prohibits execution of the EV home control (Step S245).

When it is determined in Step S230 that the vehicle 1 has passed through the end point of target downhill section D (YES in Step S230), the HV-ECU 100 ends the downhill SOC control (Step S250). Specifically, the HV-ECU 100 sets the target SOC to the normal value Sn.

With ending of the downhill SOC control, the HV-ECU 100 releases prohibition of the EV home control (Step S255).

The routine of the EV home control is the same as the routine illustrated in FIG. 10 and thus detailed description thereof will not be repeated.

As described above, the HV-ECU 100 according to this modified example is configured not to execute the EV home control during execution of the downhill SOC control. Accordingly, it is possible to prevent the SOC of the power storage device 60 from not being changed according to the purpose of the downhill SOC control.

It should be understood that the above-disclosed embodiments are exemplary in all respects and are not restrictive. The scope of the present disclosure is defined by the appended claims, not by the above description, and includes all modifications within meanings and scopes equivalent to the claims.

What is claimed is:
1. A hybrid vehicle comprising:
   an internal combustion engine;
   a first rotary electrical machine configured to generate electric power using power of the internal combustion engine;
   a second rotary electrical machine connected to driving wheels of the hybrid vehicle;
   a power storage device electrically connected to the first rotary electrical machine and the second rotary electrical machine; and
   an electronic control unit configured to:
   (i) execute pre-change control which changes an amount of power stored in the power storage device in advance before the hybrid vehicle enters a control target section on a scheduled traveling route,
   (ii) execute electric motor priority control of suppressing activation of the internal combustion engine more when the hybrid vehicle travels in a specific area than when the hybrid vehicle travels in an area other than the specific area, and

(iii) prohibit execution of the electric motor priority control when the hybrid vehicle travels in the specific area and the pre-change control is being executed, (iv) during execution of the pre-change control, not execute the electric motor priority control but to continuously execute the pre-change control when execution conditions of the electric motor priority control are satisfied and when the hybrid vehicle is traveling in an area where the pre-change control is executed based on scheduled traveling route information and/or road traffic information, and (v) during execution of the electric motor priority control, stop execution of the electric motor priority control and execute the pre-change control when execution conditions of the pre-change control are satisfied and when the hybrid vehicle is traveling in the area where the pre-change control is executed based on the scheduled traveling route information and/or the road traffic information.

2. The hybrid vehicle according to claim 1, wherein the pre-change control includes congestion state of charge control, and the congestion state of charge control is control of increasing an amount of power stored in the power storage device in advance before the hybrid vehicle enters a congested section satisfying a first condition when the congested section is present as the control target section on the scheduled traveling route.

3. The hybrid vehicle according to claim 1, wherein the pre-change control includes downhill state of charge control, and the downhill state of charge control is control of decreasing an amount of power stored in the power storage device in advance before the hybrid vehicle enters a downhill section satisfying a second condition when the downhill section is present as the control target section on the scheduled traveling route.

4. The hybrid vehicle according to claim 1, wherein the specific area is an area within a predetermined distance from a specific point.

* * * * *